US010846549B2

(12) United States Patent
Zhou

(10) Patent No.: US 10,846,549 B2
(45) Date of Patent: Nov. 24, 2020

(54) MARKER FOR OCCLUDING FOREIGN MATTER IN ACQUIRED IMAGE, METHOD FOR RECOGNIZING FOREIGN MATTER MARKER IN IMAGE AND BOOK SCANNING METHOD

(71) Applicant: DALIAN CZUR TECH CO., LTD., Liaoning (CN)

(72) Inventor: Kang Zhou, Liaoning (CN)

(73) Assignee: DALIAN CZUR TECH CO., LTD., Liaoning (CN)

( * ) Notice: Subject to any disclaimer, the term of this patent is extended or adjusted under 35 U.S.C. 154(b) by 0 days.

(21) Appl. No.: 16/496,877

(22) PCT Filed: Mar. 30, 2017

(86) PCT No.: PCT/CN2017/078745
§ 371 (c)(1),
(2) Date: Sep. 23, 2019

(87) PCT Pub. No.: WO2018/170937
PCT Pub. Date: Sep. 27, 2018

(65) Prior Publication Data
US 2020/0104621 A1    Apr. 2, 2020

(30) Foreign Application Priority Data
Mar. 24, 2017 (CN) .......................... 2017 1 0182739

(51) Int. Cl.
*G06K 9/20* (2006.01)
*G06K 9/46* (2006.01)
(Continued)

(52) U.S. Cl.
CPC ....... *G06K 9/2063* (2013.01); *G06K 9/00382* (2013.01); *G06K 9/00442* (2013.01);
(Continued)

(58) Field of Classification Search
CPC .......... H04N 5/23219; H04N 1/00307; H04N 2101/00; H04N 2201/3278;
(Continued)

(56) References Cited

U.S. PATENT DOCUMENTS 5,065,257 A * 11/1991 Yamada ................. H04N 1/403
358/453
9,165,185 B2 * 10/2015 Hamel ................. G09B 21/007
(Continued)

FOREIGN PATENT DOCUMENTS

CN        1753448 A      3/2006
CN      101915573 A     12/2010
(Continued)

*Primary Examiner* — Negussie Worku
(74) *Attorney, Agent, or Firm* — Novick, Kim & Lee, PLLC; Allen Xue

(57) ABSTRACT

A marker for occluding a foreign matter in an acquired image contains a mark part whose surface is provided with a two-side continuous pattern formed by combining at least one or multiple primitives; and a fixing part which fixes a marker to a surface of foreign matter in the acquired image with the mark part to facilitate algorithm recognition and marking. The method for recognizing a foreign matter marker in an image includes the steps of performing edge detection on a planar image to acquire an edge map in the planar image; and extracting all contours in the edge map. A certain number of alternative straight-line segments are determined using an algorithm; a region is determined according to the position of each alternative straight-line segment; and finally the region of the approximate area above or below the marker is used.

9 Claims, 8 Drawing Sheets

(51) Int. Cl.
*H04N 1/62* (2006.01)
*G06K 9/00* (2006.01)

(52) U.S. Cl.
CPC .......... *G06K 9/4604* (2013.01); *H04N 1/626* (2013.01); *G06K 2209/501* (2013.01)

(58) Field of Classification Search
CPC ....... H04N 1/32101; H04N 2201/3225; H04N 2201/3274; H04N 1/2133; H04N 5/23222; H04N 5/33; H04N 5/23206; H04N 2013/0074; H04N 13/246; H04N 1/00127; H04N 1/00244; H04N 1/00328; H04N 1/00331; H04N 1/00336; H04N 1/626; H04N 2201/0084; H04N 5/2254; H04N 5/2256; H04N 5/2354; H04N 9/04; G06F 16/58; G06F 16/9535; G06F 16/5838; G06F 16/29; G06F 16/50; G06F 16/583; G06F 16/9537; G06F 16/9554; G06F 3/0482; G06F 16/5866; G06F 3/04842; G06F 16/337; G06F 16/436; G06F 19/00; G06F 1/163; G06F 21/32; G06F 3/011; G06F 3/012; G06F 3/013; G06F 3/0304; G02B 2027/0138; G02B 2027/014; G02B 2027/0178; G02B 2027/0141; G02B 27/017; G02B 27/0172; G02B 27/0093; G02B 27/0176; G02B 13/14; G02B 2027/0187; G02B 7/002
USPC .................................................. 358/505, 474
See application file for complete search history.

(56) References Cited

U.S. PATENT DOCUMENTS

| | | | |
|---|---|---|---|
| 10,291,805 B1* | 5/2019 | Moro | H04N 1/00785 |
| 10,635,723 B2* | 4/2020 | King | G06Q 10/10 |
| 2005/0157351 A1* | 7/2005 | Matsuda | H04N 1/125 358/474 |
| 2008/0225355 A1* | 9/2008 | Kagami | H04N 1/1013 358/496 |
| 2009/0009828 A1* | 1/2009 | Kagami | H04N 1/00477 358/498 |
| 2009/0254994 A1* | 10/2009 | Waterson | H04L 63/145 726/26 |
| 2010/0309530 A1* | 12/2010 | Kamei | H04N 1/00002 358/474 |
| 2011/0074763 A1* | 3/2011 | Zhou | G06F 1/3203 345/212 |
| 2013/0272602 A1 | 10/2013 | He et al. | |
| 2018/0341727 A1* | 11/2018 | Hou | G01V 11/00 |
| 2019/0182398 A1* | 6/2019 | Zhou | H04N 1/00328 |
| 2020/0167631 A1* | 5/2020 | Rezgui | G06F 8/30 |

FOREIGN PATENT DOCUMENTS

| | | |
|---|---|---|
| CN | 104509102 A | 4/2015 |
| CN | 106127203 A | 11/2016 |
| CN | 106412570 A | 2/2017 |
| TW | 201023622 A | 6/2010 |

* cited by examiner straight-lines meeting the condition

```
┌─────────────────────────────────────────────────────────────────────┐
│  Acquire a page planar image comprising a page dressed with a       │
│  marker; and complete image pre-processing which comprises          │
│  binarization and denoising                                         │
└─────────────────────────────────────────────────────────────────────┘
                                    ↓
┌─────────────────────────────────────────────────────────────────────┐
│  Perform edge detection on a planar image to acquire an edge map    │
│  in the planar image; extract all contours in the edge map; and     │
│  obtain alternative parallel straight-line segments by means of     │
│  performing straight-line screening on all of the contours          │
└─────────────────────────────────────────────────────────────────────┘
                                    ↓
┌─────────────────────────────────────────────────────────────────────┐
│  Extract a region image in which the parallel straight-line segment │
│  sreside from the acquired plan image                               │
└─────────────────────────────────────────────────────────────────────┘
                                    ↓
┌─────────────────────────────────────────────────────────────────────┐
│  Acquire a local edge map by performing binarization and edge       │
│  detection on the image of the region, extract a local contour in   │
│  the local edge map, and acquire local contours of all ellipses and │
│  circles as alternative circles by screening the local contours;    │
│  and calculate the elliptical center and lengths of long axis and   │
│  short axis of the contour of each ellipse                          │
└─────────────────────────────────────────────────────────────────────┘
                                    ↓
┌─────────────────────────────────────────────────────────────────────┐
│  Examine the median length and median angle of the straight-line    │
│  segments near each alternative circle, and remove the alternative  │
│  straight-line segments with a deviation exceeding a threshold      │
│  range by comparing each straight-line segment with the median      │
│  angle and median length                                            │
└─────────────────────────────────────────────────────────────────────┘
                                    ↓
┌─────────────────────────────────────────────────────────────────────┐
│  Calculate the pixel center $C$ of all the straight-line segments   │
│  meeting the condition as the center position reference of the      │
│  marker; calculate the average length $R$ of the long axes of all   │
│  the ellipses as the index for judging a distance between the       │
│  marker and a lens; and calculate the average length $L$ of all the │
│  straight-lines as the basis for a downward inclination degree of   │
│  fingers                                                            │
└─────────────────────────────────────────────────────────────────────┘
                                    ↓
┌─────────────────────────────────────────────────────────────────────┐
│  Calculate the pixel center $C$ of all the straight-line segments   │
│  meeting the condition; calculate the average length of the long    │
│  axes of all the ellipses; calculate the image range $R$ of the     │
│  marker according to the pixel center $C$, the average length $R$   │
│  of the long axes and the average length $L$; and calculate the     │
│  average length $L$ of all the straight lines as the basis for the  │
│  downward inclination degree of fingers                             │
└─────────────────────────────────────────────────────────────────────┘
                                    ↓
┌─────────────────────────────────────────────────────────────────────┐
│  Use an image of an approximate area above or below the marker to   │
│  cover the image range, remove the marker image of the current page │
│  to complete the scanning the current page                          │
└─────────────────────────────────────────────────────────────────────┘
```

Fig. 15

MARKER FOR OCCLUDING FOREIGN MATTER IN ACQUIRED IMAGE, METHOD FOR RECOGNIZING FOREIGN MATTER MARKER IN IMAGE AND BOOK SCANNING METHOD

TECHNICAL FIELD

The present invention relates to a marker for occluding a foreign object on a book page in an image acquisition scanning process, an algorithm for recognizing a marker in an image and a book scanning method, as well as a corresponding book page turning scanning method of image acquisition. The patent relates to IPC number of: G06-computing; calculating; counting; G06F-electric digital data processing; G06F9/00-arrangements for programme control, e.g. control unit; G06F9/06-using stored programme, i.e. using internal store of processing equipment to receive and retain programme; G06F9/44-arrangements for executing specific programmes.

BACKGROUND ART

A scanner based on video image acquisition acquires book page photos through a camera located above a scanned object, and an image is processed by a video algorithm to complete the scanning, thus avoiding heavy workload caused by the traditional scanning mode of manually pressing the printed matter to be scanned on a scanning surface.

However, according to such scanning device, a book page needs to be turned by hands when a thick book is scanned or in a quick scanning process, and in order to maintain the book page flat in the scanning process, one-sided or two-sided book page needs to be pressed by hands/fingers, resulting in that an image of the book page acquired by the algorithm inevitably has an image of fingers.

An elliptical skin color model is used to extract a skin color region, thus positioning the finger and removing a region near the skin color region. Elliptical skin color model: a skin color image is transformed from a RGB space to a YCrCb color space, and in a two-dimensional space of CrCb, a sample region shows elliptical characteristics, so that people use an approximate elliptical region in the CrCb space as a basis for judging the skin color.

However, due to the variety of contents of a book used for scanning and the influence of light changes, it is easy to cause false detection and missed detection by simply using color characteristics to recognize a finger region.

SUMMARY OF THE INVENTION

For the problems proposed above, the present invention provides a marker for occluding a foreign object in an acquired image, which comprises:

a mark part, whose surface is provided with a two-side continuous pattern formed by combining at least one or multiple geometric primitives; and a fixing part, which fixes a marker to a surface of a foreign object in an acquired target (such as fingers for turning book pages, or the surface of a disclosed similar automatic book page turning mechanism appearing on the book page) to make the surface of the foreign object in the acquired image covered by the mark part so as to facilitate algorithm recognition and marking.

In order to facilitate the algorithm recognition, in some implementations, the geometric primitive comprises equal-length straight-line segments, and quarter circles or hollow circles or ellipses, and the equal-length straight-line segments are parallel to each other.

In order to facilitate the definition of a graphical range of a whole marker by an algorithm, in some implementations, the two-side continuous pattern is concentrated in a rectangular recognition region located in the middle of the mark part, each equal-length line segment is perpendicular to a long side of the rectangular region, and a connecting line of focal points of the ellipses (or connecting line of center points of focal lengths of the ellipses) is parallel to the long side of the rectangular region.

Further, in order to enhance contrast difference between the geometric primitive and the back ground and heighten edge change gradient, so that the geometric primitive can be more obvious under different lights, in some implementations, a color of the rectangular recognition region is reverse to a color of the geometric primitives in the two-side continuous pattern.

Further, in order to perform accurate positioning and recognition through algorithm (the principle will be described below in detail), when the mark part comprises multiple geometric primitives, each two-side continuous pattern is composed of one geometric primitive; and multiple two-side continuous patterns are parallel to the long side of the rectangular region.

The multiple two-side continuous patterns at least comprise two-side continuous patterns of the parallel straight-line segments and two-side continuous patterns of quarter circles/hollow circles.

The invention also provides a method for recognizing a marker of foreign object in an image comprises the following steps of:

a. acquiring a planar image comprising the marker; and performing image preprocessing at least comprising binarization and denoising;

b. performing edge detection on the planar image to acquire an edge map in the planar image; and extracting all contours in the edge map;

c. performing straight-line screening on all contours to acquire the two-side continuous patterns of the parallel straight-line segments in the marker;

d. extracting an image of a region where the parallel straight-line segments are located from the acquired planar image;

in some implementations, firstly determining a certain number of alternative straight-line segments by the algorithm, according to the position of each alternative straight-line segment to determining the region thereof, outwardly expanding the region with a larger dimension from an initial straight-line segment position, and then acquiring a final image of the region by taking a circumscribed rectangle of each expanded connected region (which may be a connected region caused by overlapping of the expansion of many straight-line segment regions);

e. acquiring a local edge map corresponding to the marker by performing edge detection on the image of the region, extracting a local contour in the local edge map, and acquiring local contours of all ellipses as alternative circles by screening the local contours; and calculating the focal point of an ellipse and lengths of long axis and short axis of each contour of the ellipse;

f. examining median length and median angle of the straight-line segments near each alternative circle (considering that interference straight-line segments on some non-fingerstall patterns nearby are detected sometimes, for example, the straight-line that are very possible to appear in a book have relatively large differences with lengths and angles of the straight-line segments in the marker, an calculated average number is very likely to brought in errors, so that the medians are used), and removing the alternative straight-line segments with a deviation exceeding a threshold range by comparing each straight-line segment with the median angle and median length;

g. considering positions of pixel centers of the parallel straight-line segments and the ellipses respectively, selecting the two-side continuous pattern closer to the pixel center of the pattern of the marker, calculating the pixel center of the pattern; in the embodiment described subsequently, the parallel straight-line segments being more closer to the center, and selecting the pixel center C of the parallel straight-line segments as a center position reference of the marker; calculating an average length R of the long axes of all the ellipses as an index for judging a distance between the marker and a lens; and calculating an average length L of all the straight-lines as a basis for a downward inclination degree of a finger; and h. calculating an image range of the marker according to the pixel center C, the average length R of the long axis and the average length L.

In some implementations, edge detection is performed on the planar image by Canny edge detection; and non-linear segment contours are eliminated by determining a threshold range of bounding area of the contour, a minimum dimension of a circumscribed rectangle of the contour and a length-width ratio of the circumscribed rectangle.

In order to ensure an accuracy of the algorithm, in some implementations, before calculating the pixel center of all the straight-line segments meeting the condition, a step of screening corresponding relationships between the alternative circles and the alternative straight-line segments is performed.

Each straight-line found is compared with each alternative circle to find associated straight-lines meeting the condition around each circle. Generally, the farther the marker from the lens is, the smaller the image pixel distance between points is; and the greater the inclination degree of the marker is, the smaller the image pixel distance between points is.

A distance between an end of each straight-line and the focal point meets requirements of upper and lower thresholds, the end of each straight-line is a near end of each straight-line segment relative to a focal point; and a height of a camera for acquiring an image of a book page, a distance between the marker and the lens, the inclination degree of the marker and a camera resolution are comprehensively considered. Combined with the factors above, the following parameter thresholds are given: a lower limit of 8 pixels and an upper limit of 45 pixels; meanwhile, a distance between a far end (relative to the focal point) of each straight-line segment and the focal point meets a threshold requirement of lower limit: no less than a lower limit of 25 pixels, which can meet an image acquisition accuracy with conventional mainstream resolution ratios of 720 p and 1080 p, as well as algorithm running speeds of 2 k and even 4 k.

The associated straight-lines around each circle are found according to the method above, and the alternative circle is deleted if a number of associated straight-lines found around the circle is less than four.

In some implementations, the alternative straight-line segments are determined whether to pass through the corresponding alternative circle before calculating the pixel center of all the straight-line segments meeting the condition; and if an alternative straight-line segment passes through the corresponding alternative circle, the alternative straight-line segment is removed.

Further, considering that in practical application, for example, a certain circle (such as the drawing) may exist in the contents of the book around the place pressed by a finger wearing the marker, a distance between the circle/ellipse and a straight-line on a fingerstall is significantly greater than the ellipse/circle in the marker. Therefore, in some implementations, the threshold is used to remove the external interference circles: focal point of a alternative circle is determined whether to deviate from a connecting line of the alternative circle before calculating the pixel center of all the straight-line segments meeting the condition; and if the deviation exceeds the threshold distance, the alternative circle is removed.

Further, a center straightness of all associated straight-lines is calculated before calculating the pixel center of all the straight-line segments meeting the condition, center straightness is an average distance from a center of each straight-line to a center line, the center line is formed by the centers of all the associated straight-lines; and if the average distance is greater than 3 pixels, an associated straight-line group is deleted and the corresponding alternative circle is deleted at the same time.

The invention also provides a book scanning method comprises the following steps of: for a two-dimensional image of a book page with a marker having marker occluding, determining an image range of the marker; and using a region of an approximate area above or below the marker to expand to the image range of the marker, removing the image of the marker of a current book page to complete the scanning of the current book page.

BRIEF DESCRIPTION OF THE DRAWINGS

In order to more clearly illustrate the technical solutions in the embodiments of the invention or the prior art, the drawings to be used in the embodiments or the description of the prior art will be briefly introduced below. Obviously, the drawings in the following description merely indicate some embodiments of the invention, and those of ordinary skills in the art can further obtain other drawings according to these drawings without going through any creative work.

FIG. 15 illustrates a flow chart of the recognition method for book scanning according to the invention.

DETAILED DESCRIPTION OF THE EMBODIMENTS

In order to make the objects, the technical solutions and the advantages of the embodiments of the invention clearer, the technical solutions in the embodiments of the invention are clearly and completely described with reference to the drawings in the embodiments of the invention.

Figure 1:
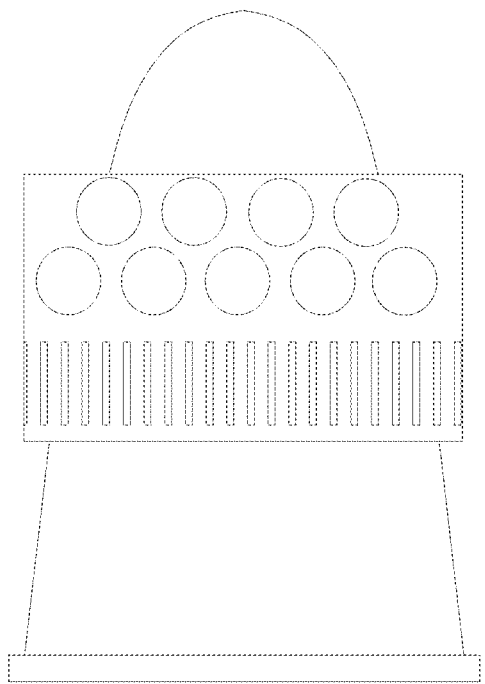
FIG. 1 illustrates a diagram of a fingerstall as a marker in the embodiment of the invention.

As shown in FIG. 1, the embodiment provides a fingerstall solution for turning book pages by finger, the fixing part is a plastic/rubber fingerstall which is a circle similar to a rotator, and is convenient to be sleeved on a finger of a user turning the book page, and meanwhile, a larger friction force exists between plastic material and paper book page.

A rectangular recognition region perpendicular to a center axis is arranged in a middle of the pattern shown in FIG. 1, a two-side continuous pattern formed by equal-length straight-line segments parallel to each other and two rows of two-side continuous patterns formed by hollow circles are arranged in the region, wherein the two rows of hollow circles are staggered. In the embodiment, only a solution of a circle as a special case of an ellipse is considered.

Figure 2:
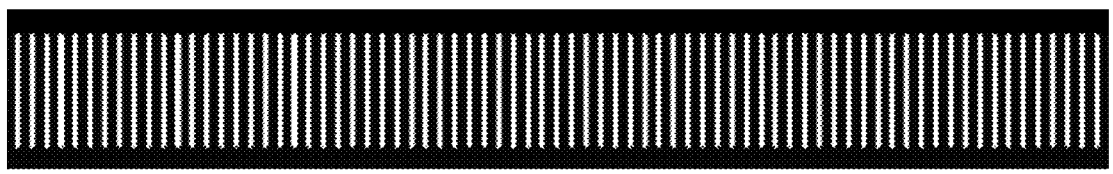
FIG. 2 illustrates a diagram of straight-line segment pattern in the embodiment of the invention.
Figure 3:
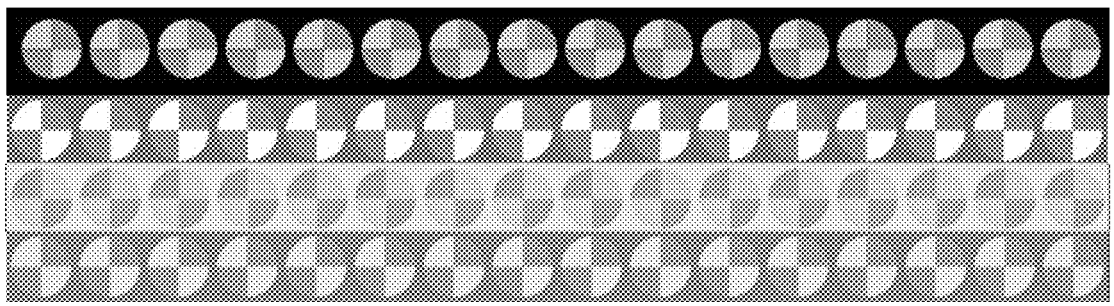
FIG. 3 illustrates a diagram of quarter circle pattern in the embodiment of the invention.
Figure 4:
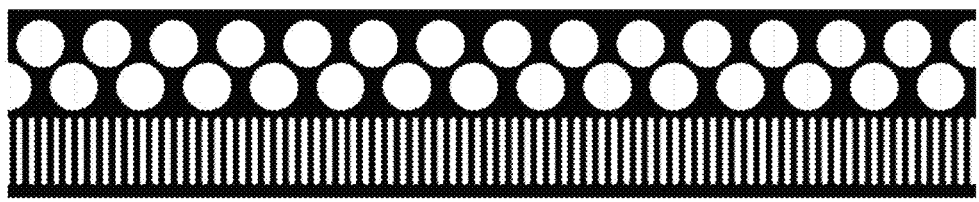
FIG. 4 illustrates a diagram of pattern in the embodiment of the invention.

In terms of color selection, for geometric primitives (as shown in FIGS. 2 and 3) i.e. the parallel equal-length line segments and the hollow circles are all white, and a background color of the rectangular recognition region is black, which is reverse to white, the fingerstall is yellow as a whole (in some implementations, other colors which are quite different from book paper can also be used, as shown in FIG. 4).

In order to facilitate wearing, the inner surface of the fingerstall/marker is also provided with densely arranged rubber/plastic teeth, which act together with an elasticity of a rubber/plastic material to ensure firm wearing without causing discomfort to a finger due to excessive pressure (when a finger diameter is larger, the rubber teeth can deform themselves to reduce the pressure on the finger).

Meanwhile, the rubber/plastic teeth are arranged along a direction where the finger enters the fingerstall to facilitate wearing and taking off the fingerstall, and a firmness in the process of turning book page by a lateral movement of the finger is ensured, especially a friction force between a sweaty finger and a rubber material may be smaller than a friction force between the rubber material and a paper book page, thus causing deflection of the fingerstall.

Embodiment 1 is a book scanning application scenario, which mainly solves an influence on an image of a book in a process of turning a book page by a finger during image acquisition scanning, as shown in FIGS. 2 to 15.

Figure 5:
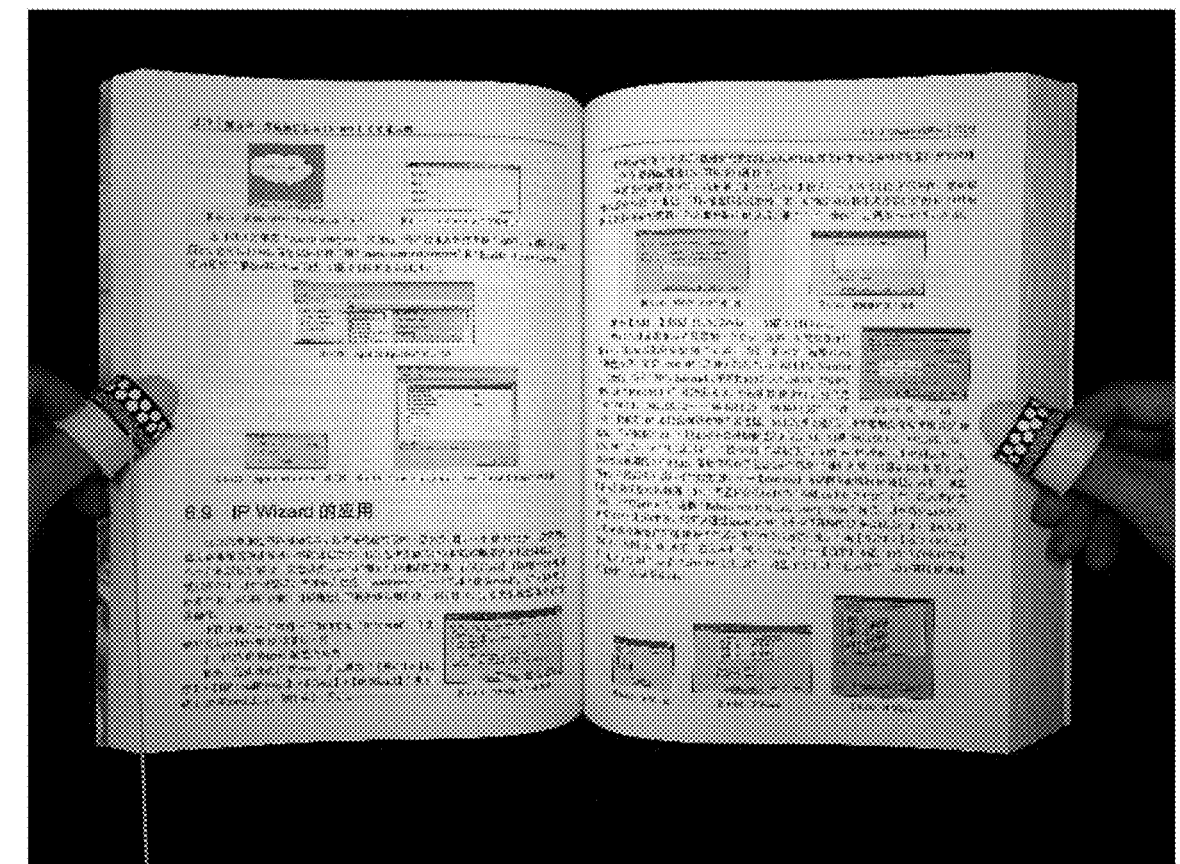
FIG. 5 illustrates a diagram of planar image according to the invention.

(I) straight-line segments with an appropriate size are found from an image:

1. the image is converted into a gray-scale map (as shown in FIG. 5);

2. median filtering [5,5] is performed to denoise;

3. Canny edge detection is performed, with a lower gradient limit of 75 and an upper gradient limit of 120, to acquire an edge map of the image;

4. a contour is extracted from the edge map;

5. each small contour is analyzed whether to meet dimension and shape requirements of a straight-line of a fingerstall, thus removing non-linear segment contour:

a) an area enclosed by the contour shall meet requirements of upper and lower limits: a lower limit of area of 10 pixels and an upper limit of area of 500 pixels;

b) width and height corresponding to a minimum circumscribed rectangle of the contour are acquired, and a long side of the circumscribed rectangle needs to meet requirements of upper and lower limits in a straight-line length: a lower length limit of 12 pixels and an upper length limit of 70 pixels; and c) a length-width ratio of the circumscribed rectangle shall be greater than three;

according to the contour meeting the shape and dimension requirements above, two end points of the corresponding straight-line segment are acquired according to the circumscribed rectangle, and each straight-line segment represented by the two end points is stored as an alternative straight-line segment; and 6. an overlapping line of alternative straight-lines is removed: a judgment basis is that two straight-lines are considered to be overlapped if both the distance between the two end points of the two lines are less than 3 pixels.

A yellow line segment in the drawing (FIG. 5) is a straight-line meeting the condition found in the step.

Figure 6:
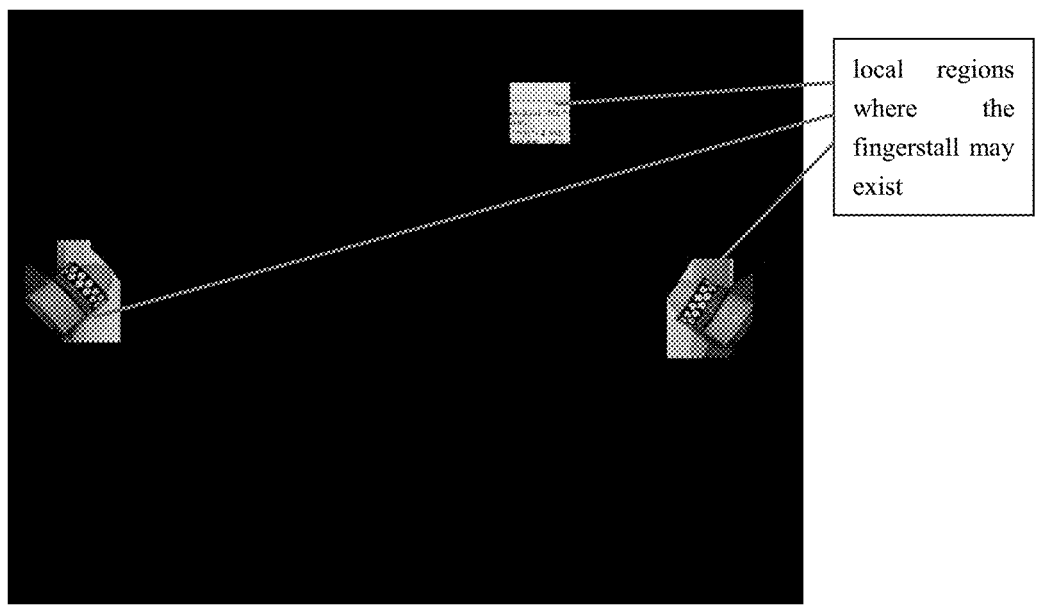
FIG. 6 illustrates a diagram of local image extracted according to the invention.

(II) A local region where the fingerstall may exist is positioned according to a density of the straight-line segments, as shown in FIG. 6:

1. a center, a slope and a length of each straight-line segment are calculated;

2. the straight-line segment is compared with characteristics of every other straight-line segment in sequence to judge whether they meet all the following requirements:

a) a distance between the centers of two straight-line segments meets requirements of upper and lower limits: a lower limit of 4 pixels and an upper limit of 60 pixels;

b) a slope difference between the two straight-line segments is less than 0.05; and c) a length difference between the two straight-line segments is less than 0.3 times a length of either straight-line segment;

if a relationship between some straight-line segment and the straight-line segment meets all the requirements above, a number of similar straight-line segments corresponding to the straight-line segment is increased by one; and 3. a region where a cumulative number of similar straight-line segments exceeds a threshold 5 is extracted to acquire an approximate fingerstall region.

(III) A circle is found in the region above:

1. as shown in FIG. 6, a local positioning map above is converted into a gray-scale map;

2. Canny edge detection is performed on the gray-scale map, with a lower gradient limit of 50 and an upper gradient limit of 100 to acquire an edge map;

3. a contour is extracted for the edge map;

4. each contour is analyzed to find a contour conforming to characteristics of an ellipse:

a) an area of the contour shall meet requirements of a threshold range: a lower limit of 200 pixels and an upper limit of 2500 pixels; and b) a ellipse is fitted according to a two-dimensional point set of the contour, a difference between an area of the fitted ellipse and an area of a real contour is calculated, and the difference between the two areas shall be less than 10 pixels. Otherwise, an ovality of the contour is considered to be insufficient.

The contours meeting the two conditions above are retained and are considered as alternative circle patterns of the fingerstall, and a focal point of an ellipse and lengths of a long axis and a short axis of each contour are recorded.

Figure 8:
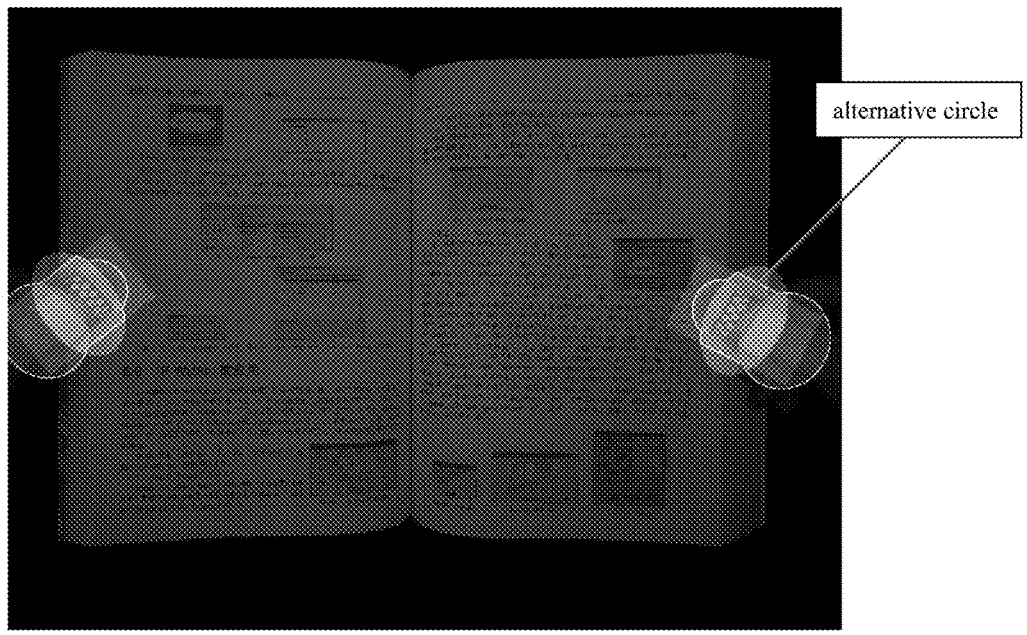
FIG. 8 illustrates an analysis diagram of the mask in recognition method embodiment of the invention.

A blue part in FIG. 8 is an alternative circle found.

(IV) Information of circles and straight-line segments are combined, and the alternative circles and the straight-line segments are screened.

1. First screening:

a) each straight-line segment found is compared with each alternative circle to find associated straight-line segments meeting the condition around each circle, and the condition is that a distance between an end of straight-line segment (the end is a near end of each straight-line relative to a focal point) and the focal point meets requirements of upper and lower limits: a lower limit of 8 pixels and an upper limit of 45 pixels; and meanwhile, a distance between a far end (relative to the focal point) of each straight-line segment and the focal point meets a lower limit requirement of no less than 25 pixels;

b) the associated straight-line segments around each circle are found according to the method above, and the alternative circle is deleted if a number of associated straight-line segments found around the circle is less than four; and c) angles, lengths and centers of the remaining associated straight-line segments around the alternative circle meeting the condition are stored.

2. Second screening:

a) median length and median angle of the straight-line segments near each alternative circle are calculated, the angle and length of each straight-line segment are compared with the two medians, and the difference shall meet the requirements of upper and lower limits: a difference between the angle of each straight-line segment and the median angle cannot be greater than 5 degrees; and a difference between each straight-line segment and the median length cannot be greater than 5% of the median length;

b) a line that does not meet the requirements of the upper and lower limits is deleted from an associated straight-line queue; and c) if a number of remaining associated straight-line segments around a certain circle is less than four after filtering in the previous step, the alternative circle is deleted.

3. Third screening:

a) two end points of each straight-line segment cannot cross two ends of the associated alternative circle. Otherwise, it means the straight-line passes through the circle, and the circle of which the straight-line pass through will be deleted.

4. Fourth screening:

a) center points of all associated straight-line segments of the alternative circles are calculated, and a center line is fitted by using the center points; and b) a distance between a center of each alternative circle and the above center line is calculated, and the distance shall be not less than 0.8 times the median length of the associated straight-line segments of the circle. The circle that does not meet the condition is deleted.

5. Fifth screening:

a) a center straightness of all associated straight-line segments is calculated, i.e. an average distance from a center of each straight-line segment to a center line formed by the centers of all the associated straight-line segments; and b) if the average distance above is greater than 3 pixels, the associated straight-line group is deleted and the corresponding alternative circle is deleted at the same time.

After the five rounds of screening above, the circle retained is a circle on the fingerstall finally determined, and meanwhile, information of the associated straight-line segments meeting the condition and corresponding to each circle is also saved.

Figure 7:
FIG. 7 illustrates a diagram of a mask of an image range of the marker (fingerstall) in recognition method embodiment of the invention.
Figure 9:
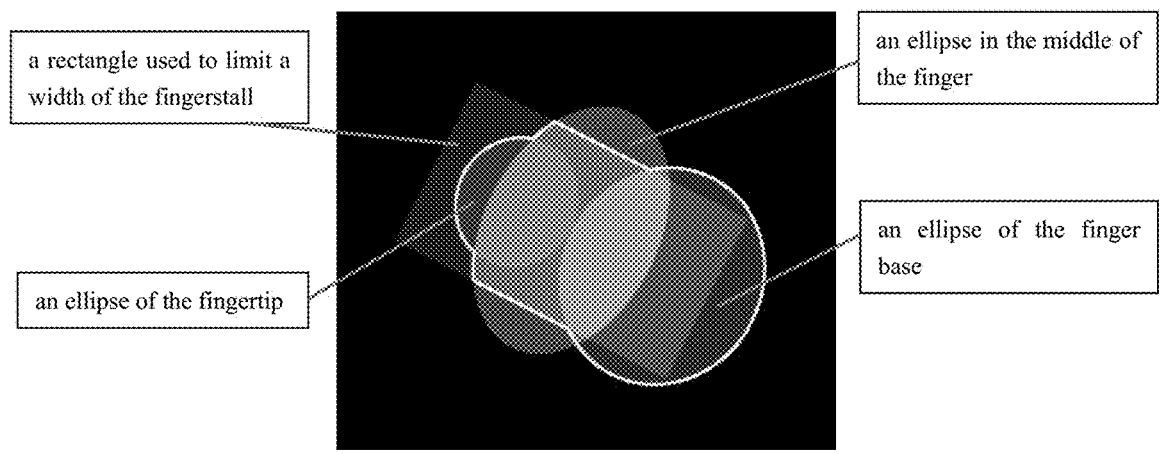
FIG. 9 illustrates a detail structure diagram of the mask in recognition method embodiment of the invention.
Figure 10:
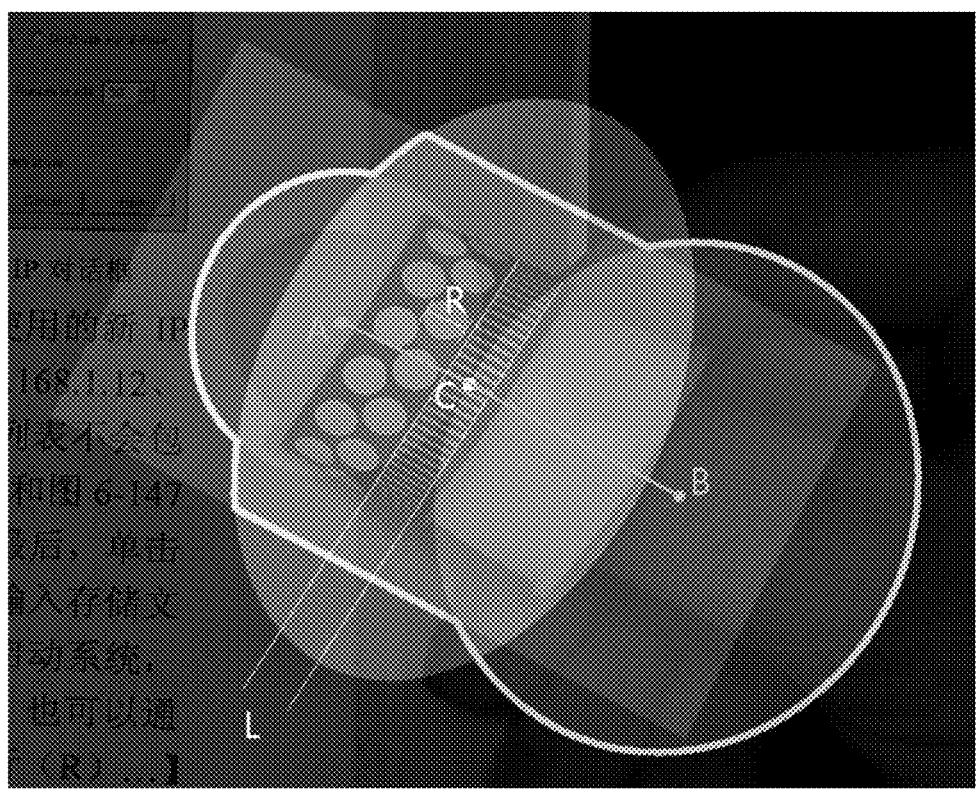
FIG. 10 illustrates a diagram of marker parameter calculation in recognition method embodiment of the invention.
Figure 11:
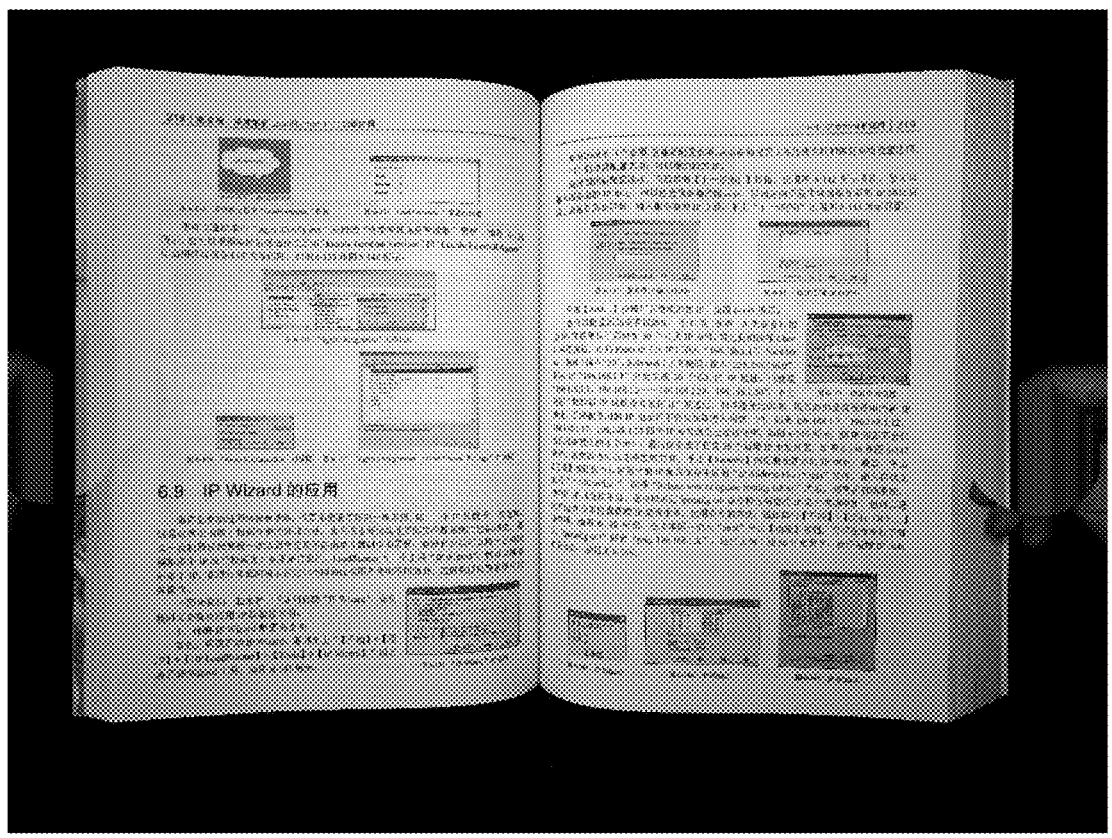
FIG. 11 illustrates a diagram of scanned image after removing the marker in recognition method embodiment of the invention.

After completing positioning, a whole fingerstall image mask can be acquired, as shown in FIGS. 7-9, a typical mask range is composed of four parts: a rectangle (used to limit a width of the fingerstall), an ellipse in the middle of a finger, an ellipse of a fingertip, and an ellipse of a finger base.

Short axes of the three ellipses in the drawing all follow a direction of an A-B line of the finger, and the direction is corresponding to a length or a length direction of a finger region. Lengths of the short axes of the three ellipses all depend on L: when an inclination degree of the finger is determined, and closer to the lens, the L is larger, and the length of the finger region is increased; and when a distance between the finger and the lens is determined, the greater the downward inclination of the fingertip is, the smaller the L is, and the shorter the length of the finger region is.

The long axes of the three ellipses shown in the drawing and the width of the rectangle are all perpendicular to the direction of the A-B line (i.e. a direction of a center axis of the fingerstall, a cross section of the rubber/plastic fingerstall in a non-use state shows a symmetrical image as a whole, which is similar to an ellipse), and the direction is corresponding to the width of the finger region. All lengths of the patterns depend on R, because R is the long axis of the ellipse, thus having nothing to do with the inclination degree of the finger and being related to the distance between the finger and the lens only. When the finger is closer to the lens, the R is larger, and the width of the finger is increased at the moment.

A relationship of a size and a position of each part corresponding to center C of the fingerstall, average length R of the long axes of the ellipses and average length L of the straight-lines is as follows:

for the rectangle: C is used as a center, with a length of 15L and a width of 9.5R; for the ellipse in the middle of the finger: C is used as a center, with a radius of 4.3L of a short axis and a radius of 7R of a long axis; for the ellipse of the fingertip: A is used as a center, $|A-C|=3L$, with a radius of 3L of a short axis and a radius of 3.5R of a long axis; for the ellipse of the figure base: B is used as a center, $|B-C|=5L$, with a radius of 5L of a short axis and a radius of 6R of a long axis.

Figure 14:
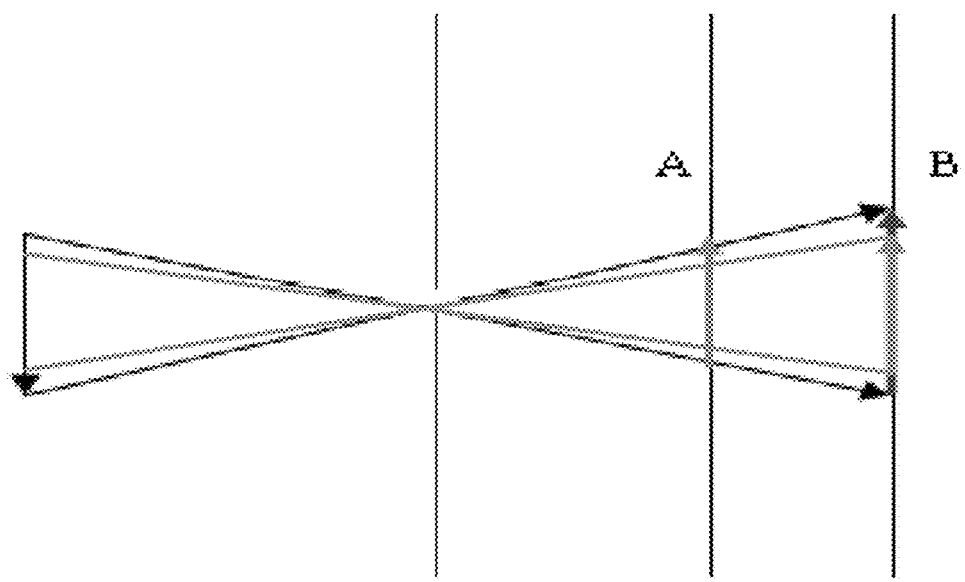
FIG. 14 illustrates a diagram of an imaging principle in recognition method embodiment of the invention.

As shown in FIG. 14, for the mathematical relationship described in the present invention, generally, for the lines of the same length in the image, a length of the corresponding actual parallel straight-line is proportional to a distance from the line to the optical center of a camera; and for parallel lines of the same length on a real object, a corresponding length is inversely proportional to a vertical distance from the line to the optical center on an imaged image.

Figure 12:
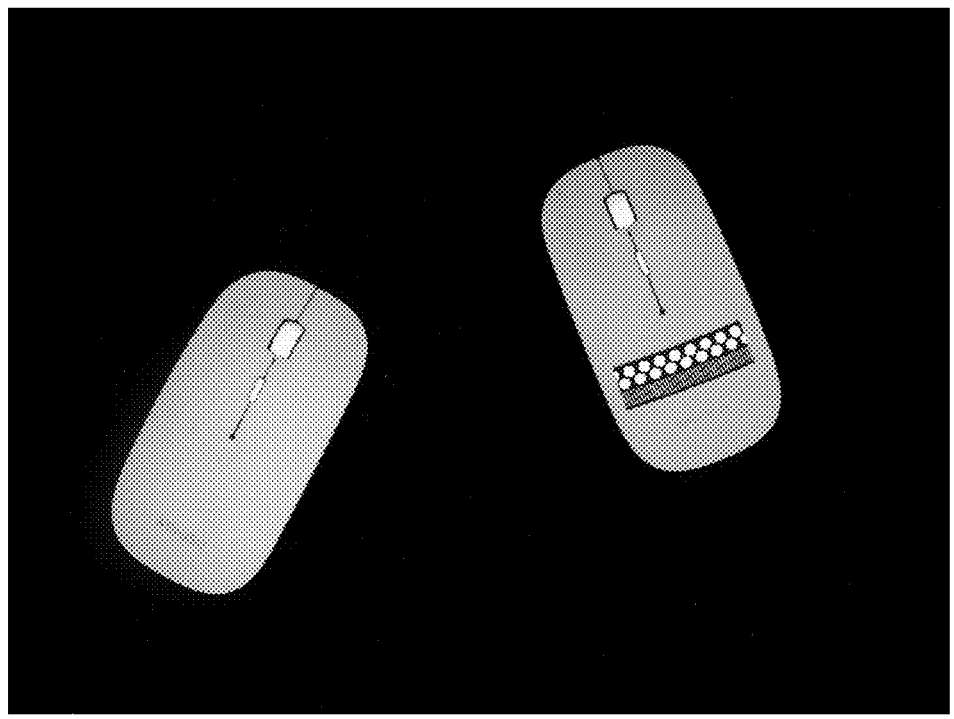
FIG. 12 illustrates a diagram of an application scenario according to embodiment 2 of the invention.
Figure 13:
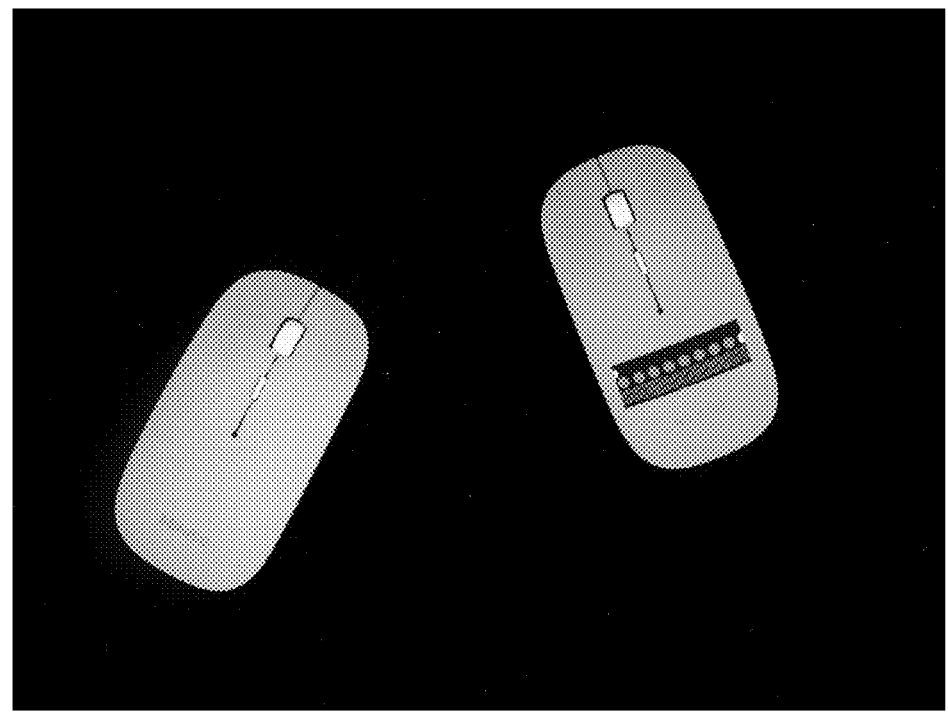
FIG. 13 illustrates a diagram of recognition results in embodiment 2 of the invention.

Embodiment 2 is a marker is used as an application scenario for general recognition to distinguish batch products. As shown in FIGS. 12 and 13, a marker is arranged on an upper surface of a mouse. In the embodiment, a fixing part of the marker is preferably in the form of adhesive plaster. The marker can be recognized by using the method in Embodiment 1.

Due to primitive characteristics and reverse color characteristics of the marker itself, the marker can be recognized in application scenarios with various color backgrounds, thus ensuring the accuracy of recognition.

The forgoing is only some embodiments of the invention without limiting the protection scope of the invention. The equal replacements or amendments made by those skilled in the art in the technical scope disclosed by the invention according to the technical solutions and the inventive concept of the invention shall fall within the protection scope of the invention.

The invention claimed is:

1. A marker for labeling a foreign object in an acquired image for occlusion, comprising:
   a surface having a repeating pattern, comprising one or more geometric primitives, a fixing means configured to be detachably affixed to the foreign object,
   wherein the geometric primitive is a straight line or a circle so that the repeating pattern comprises a plurality of straight lines that are parallelly arranged or a plurality of circles,
   wherein the repeating pattern is disposed in a rectangular recognition region, each of the plurality of straight lines is perpendicular to a long side of the rectangular region,
   wherein a line connecting focal points of the plurality of circles is parallel to the long side of the rectangular region, and
   wherein a color of the rectangular recognition region is reverse to a color of the geometric primitive.

2. The marker according to claim 1, wherein the repeating pattern is composed of a plurality of geometric primitives.

3. The marker according to claim 2, wherein the plurality of geometric primitives are selected from straight lines, quarter circles, and hollow circles.

4. The marker according to claim 1, wherein the marker is a ring and the foreign object is a finger.

5. A method for recognizing a foreign object marker in an image, comprising the following steps:
   acquiring a planar image comprising the marker according to claim 3; and
   performing image preprocessing at least comprising binarization and denoising;
   performing edge detection on Gall the planar image to acquire an edge map in the planar image;
   extracting all contours in the edge map;
   performing straight-line screening on all contours to acquire alternative parallel straight-line segments;
   extracting an image of a region where the parallel straight-line segments are located from the acquired planar image;
   acquiring a local edge map by performing binarization and edge detection on the image of the region, extracting a local contour in the local edge map, and acquiring local contours of all ellipses as alternative circles by screening the local contours;
   calculating a focal point and lengths of long axis and short axis of each contour of each ellipse;
   examining median length and median angle of the straight-line segments near each alternative circle, and removing the alternative straight-line segments with a deviation exceeding a threshold range by comparing each straight-line segment with the median angle and the median length;
   calculating a pixel center C of all the straight-line segments meeting the condition as a center position reference of a marker;
   calculating an average length R of the long axes of all the ellipses as an index for judging a distance between the marker and a lens;
   calculating an average length L of all the straight-lines as a basis for a downward inclination degree of a finger; and
   calculating an image range of the marker according to the pixel center C, the average length R of the long axis, and the average length L.

6. The method for recognizing a foreign object marker in an image according to claim 5, wherein edge detection is performed on the planar image by Canny edge detection; and non-linear segment contours are eliminated by determining a threshold range of bounding area of the contour, a minimum dimension of a circumscribed rectangle of the contour, and a length-width ratio of the circumscribed rectangle.

7. The method for recognizing a foreign object marker in an image according to claim 5, further comprising eliminating an alternative straight-line segment when the alternative straight-line segment passes through a corresponding alternative circle; and
   eliminating an alternative circle when a focal point of the alternative circle deviates from a connecting line of the alternative circle and the deviation exceeds a threshold value.

8. The method for recognizing a foreign object marker in an image according to claim 5, further comprising calculating a center straightness of each of the associated straight-line segments before calculating the pixel center of all the straight-line segments, wherein the center straightness is an average distance from a center of each straight-line segments to a center line connecting all the centers of all the associated straight-line segments; and
   when the average distance is greater than 3 pixels, deleting the associated straight-line segments and the corresponding alternative circles at the same time.

9. A book scanning method, comprising the following steps:
   determining an image range of a marker on a planar image of a book page according to the method of claim 5;
   using a region of an approximate area above or below the marker to expand to the image range of the marker, and removing the image of the marker from book page.

* * * * *